(12) United States Patent
Hase et al.

(10) Patent No.: US 7,183,236 B2
(45) Date of Patent: *Feb. 27, 2007

(54) CERAMIC CATALYST BODY

(75) Inventors: Tomomi Hase, Kariya (JP); Tomohiko Nakanishi, Nishio (JP); Hideaki Ueno, Okazaki (JP); Takatoshi Shinyoshi, Toyota (JP)

(73) Assignee: Denso Corporation, Kariya (JP)

( * ) Notice: Subject to any disclaimer, the term of this patent is extended or adjusted under 35 U.S.C. 154(b) by 175 days.

This patent is subject to a terminal disclaimer.

(21) Appl. No.: 10/633,593

(22) Filed: Aug. 5, 2003

(65) Prior Publication Data

US 2004/0092395 A1    May 13, 2004

(30) Foreign Application Priority Data

Aug. 5, 2002   (JP)   ............................ 2002-227009

(51) Int. Cl.
*B01J 35/04* (2006.01)
*B01J 23/00* (2006.01)
*B01J 20/00* (2006.01)
*B01J 21/00* (2006.01)

(52) U.S. Cl. ...................... 502/439; 502/302; 502/303; 502/304; 502/350; 502/351; 502/64; 502/65; 502/87; 502/178; 502/263; 502/355; 502/407; 502/414; 502/415; 502/524; 502/525; 502/527.12; 502/527.13; 502/527.19

(58) Field of Classification Search ........ 502/302–304, 502/350, 351, 439, 64, 65, 87, 178, 263, 502/355, 407, 414, 415, 524, 525, 527.12, 502/527.13, 527.19; 501/88, 133, 153, 154
See application file for complete search history.

(56) References Cited

U.S. PATENT DOCUMENTS 4,189,405 A * 2/1980 Knapton et al. ............. 502/73
4,316,822 A * 2/1982 Fujitani et al. ............. 502/304
4,572,904 A * 2/1986 Onal ........................ 502/333
4,587,231 A * 5/1986 Sawamura et al. ......... 502/304
4,624,940 A * 11/1986 Wan et al. .................. 502/251
4,680,282 A * 7/1987 Blanchard et al. .......... 502/304
4,708,946 A * 11/1987 Ohata et al. ................ 502/304

(Continued)

FOREIGN PATENT DOCUMENTS

EP    1 043 067 A2    10/2000

(Continued)

Primary Examiner—Cam N. Nguyen
(74) Attorney, Agent, or Firm—Nixon & Vanderhye P.C.

(57) ABSTRACT

An object of the present invention is to realize low pressure loss and high purification performance in a constitution in which a primary catalyst component and co-catalyst component are loaded onto a ceramic support that allows catalyst components to be loaded directly. According to the present invention, a primary catalyst component in the form of a catalyst precious metal and a co-catalyst component in the form of an oxygen occluding component are loaded on the surface of a honeycomb-shaped ceramic support, including the inner surfaces of pores. As a result of the large loaded amount of co-catalyst component entering inside the pores, the loaded amount of co-catalyst component on the cell wall surfaces is reduced, thereby making it possible to inhibit increases in pressure loss. In addition, since the primary catalyst component and co-catalyst component are in close proximity to each other, catalyst performance is improved.

14 Claims, 1 Drawing Sheet

U.S. PATENT DOCUMENTS

| | | | |
|---|---|---|---|
| 4,956,329 A * | 9/1990 | Chao et al. | 502/251 |
| 5,039,647 A * | 8/1991 | Ihara et al. | 502/251 |
| 5,075,276 A * | 12/1991 | Ozawa et al. | 502/304 |
| 5,260,249 A * | 11/1993 | Shiraishi et al. | 502/304 |
| 5,346,722 A * | 9/1994 | Beauseigneur et al. | 427/300 |
| 5,607,885 A * | 3/1997 | Ichii et al. | 501/9 |
| 5,716,899 A * | 2/1998 | Guile et al. | 502/439 |
| 6,214,306 B1 * | 4/2001 | Aubert et al. | 423/213.2 |
| 2001/0021358 A1 * | 9/2001 | Kikuchi et al. | 422/180 |
| 2003/0007926 A1 * | 1/2003 | Jiang et al. | 423/651 |

FOREIGN PATENT DOCUMENTS

| | | |
|---|---|---|
| JP | 5-50338 | 7/1993 |
| JP | 2001-310128 | 11/2001 |

* cited by examiner

AVERAGE PORE DIAMETER 3 μm

W/CERIA-ZIRCONIA SOLID SOLUTION (AVERAGE PARTICLE DIAMETER 0.5 μm)

AVERAGE PORE DIAMETER 3 μm

CERAMIC CATALYST BODY

BACKGROUND OF THE INVENTION

1. Field of the Invention

The present invention relates to a ceramic catalyst body preferably applied, for example, as a catalyst for purifying the exhaust gas of automobile engines.

2. Description of the Related Art

Typical three-way catalysts used as catalysts for purifying exhaust gas normally have a structure in which a coating layer of γ-alumina and so forth is formed on the surface of a ceramic support composed of highly thermal shock-resistant cordierite honeycomb structure followed by the loading of a precious metal catalyst. However, since problems such as increased thermal capacity and increased pressure loss occur due to the formation of the coating layer, studies have been conducted on the loading of catalyst components without forming a coating layer. Although Japanese Examined Patent Publication No. 5-50338 describes a method for increasing the specific surface area of the cordierite itself by heat treatment following acid treatment, the resulting destruction of the crystal lattice of the cordierite caused by the acid treatment and heat treatment results concerns over decreased strength, thereby leading to problems in terms of practicality.

Consequently, the inventors of the present invention previously proposed a ceramic support that enables catalyst components to be loaded directly into fine pores formed by substituting at least one type of element that composes the base ceramic with an element having a different valency (Japanese Unexamined Patent Publication No. 2001-310128). Since this ceramic support does not require a coating layer for improving specific surface area and eliminates the problem of decreased strength caused by acid treatment and so forth, it is expected to be applied to automobile catalysts requiring durability.

In addition, various co-catalyst components have been added to improve catalyst performance, and in the case of three-way catalysts, a co-catalyst component such as ceria is used that has the ability to occlude oxygen. Ceria has the characteristic of occluding and releasing oxygen in the vicinity of the theoretical air-fuel ratio, and the range (window) over which high purification performance can be obtained can be widened by taking advantage of this characteristic. Therefore, even in a composition in which the previously mentioned ceramic support is used that enables catalyst components to be loaded directly, attempts have been made to improve purification performance by loading a precious metal catalyst followed by loading a co-catalyst component thereon.

On the other hand, accompanying implementation of increasingly strict regulations on automobile exhaust gas, it is becoming necessary to increase the loaded amounts of precious metal catalyst and co-catalyst components in order to obtain the desired catalyst performance. However, as the amount of co-catalyst components increases, the distance between these components and the precious metal catalyst on the support surface increases, thereby resulting in the problem of decreased performance. In addition, pressure loss increases as a result of the increasing thickness of the co-catalyst layer formed on the cell wall surfaces. In particular, the wall thickness of ceramic supports has tended to be reduced in recent years for the purpose of reducing thermal capacity, while the intervals between cells have been shortened to ensure support strength, and the loading of co-catalyst components has a remarkable effect on pressure loss. Consequently, there is a need to maximally demonstrate the effects of co-catalyst components while using them in the lowest possible amounts.

In consideration of the circumstances described above, an object of the present invention is to provide a ceramic catalyst body offering low pressure loss and high purification performance that inhibits increases in pressure loss and improves catalyst performance in a composition in which a primary catalyst component and co-catalyst component are loaded on a direct-loading catalyst having low thermal capacity and high strength.

SUMMARY OF THE INVENTION

A ceramic catalyst body of a first aspect of the invention comprises the loading of a primary catalyst component and a co-catalyst component onto a ceramic support that enables catalyst components to be loaded directly onto the surface of a base ceramic. The base ceramic employs a structure having a large number of pores, and the primary catalyst component and co-catalyst component are loaded directly onto the base ceramic surface that includes the inner surfaces of these pores.

In the present invention, it was found that by focusing on the large number of pores in the base ceramic structure, and inserting a co-catalyst component loaded onto the surfaces of conventional cell walls within the pores of the base ceramic, the distance between the co-catalyst component and the primary catalyst component pre-loaded onto the surfaces within the pores can be reduced, thereby making it possible to improve catalyst performance. Consequently, since high effects can be obtained for a small amount of catalyst used, and the amount of the co-catalyst component loaded onto the outer surface of the ceramic support can be reduced, increases in pressure loss can be prevented. Thus, reduction of pressure loss and improvement of catalyst performance can simultaneous be realized by loading the primary catalyst component and co-catalyst component while in close proximity to each other onto a direct-loading support having high strength and low thermal capacity.

In a second aspect of the invention, 50% by weight or more of the co-catalyst component is loaded onto the inner surfaces of the pores. As a result, the amount of the co-catalyst component loaded onto the outer surface of the ceramic support can be reduced, which is highly effective in reducing pressure loss.

In a third aspect of the invention, 70% by weight or more of the co-catalyst component is loaded onto the inner surfaces of the pores. As a result, the amount of the co-catalyst component loaded on the inner surfaces of the pores is increased, which together with improving catalyst performance, also reduces the amount of the co-catalyst component loaded onto the outer surface of the ceramic support, thereby improving the effect of reducing pressure loss.

In a fourth aspect of the invention, the primary catalyst component and co-catalyst component are loaded directly onto at least the inner surfaces of those pores that open to the outer surface of the ceramic support. As a result of loading catalyst components into the pores on the surface of the support that are readily contacted by exhaust gas, the exhaust gas can be purified more efficiently.

In a fifth aspect of the invention, the average particle diameter of the co-catalyst component is ⅓ or less the average pore diameter of the ceramic support. As a result of making the co-catalyst component sufficiently smaller than the average pore diameter, and more specifically, ⅓ or less, the co-catalyst component can be loaded into the pores.

In a sixth aspect of the invention, the thickness of the layer of the co-catalyst component loaded onto the outer surface of the ceramic support is 20 μm or less. As a result, the action of the co-catalyst can be demonstrated effectively while inhibiting the effect on pressure loss to a minimum, thereby making it possible to improve catalyst performance.

In a seventh aspect of the invention, the co-catalyst component contains an oxygen occluding component. The oxygen occluding component is able to enhance the action of the primary catalyst component by occluding and releasing oxygen according to the oxygen concentration, and satisfactory oxygen occlusion is obtained by using at least one oxygen occluding component selected from ceria, a ceria-zirconia solid solution and that containing a transition metal element in a ceria-zirconia solid solution.

In an eighth aspect of the invention, in the ceramic support, at least one or more elements that compose the base ceramic is substituted with an element other than a composite element, and a support is used that enables the catalyst components to be loaded directly onto this substitution element. As a result of suitably selecting the substitution element, bonding strength with the catalyst components can be enhanced, allowing the obtaining of a catalyst body that is resistant to deterioration.

In a ninth aspect of the invention, the catalyst components are loaded onto the substitution element by chemical bonding. Since chemically bonding increases the holding power resulting in greater resistance to aggregation, deterioration of the catalyst components can be inhibited, and the catalyst components are able to maintain a large surface area over a long period of time.

In a tenth aspect of the invention, the substitution element is at least one type of element or more that has a d orbital or f orbital in its electron orbitals. Elements having a d orbital or f orbital in their electron orbitals facilitate bonding with catalyst metals, thereby making it possible to improve bonding strength.

As in an eleventh aspect of the invention, that having for its main component a ceramic material selected from cordierite, alumina, spinel, mullite, aluminum titanate, zirconium phosphate, silicon carbide, zeolite, perovskite and silica alumina can be used for the base ceramic.

As in a twelfth aspect of the invention, a support having a large number of fine pores that allow a catalyst to be loaded directly onto the surface of a base ceramic, and enables the catalyst components to be loaded directly into the fine pores can also be used for the ceramic support.

As in a thirteenth aspect of the invention, the fine pores are composed of at least one type of defects in the ceramic crystal lattice, microcracks in the ceramic surface, and deficiencies of an element that composes the ceramic.

As in a fourteenth aspect of the invention, a width of the microcracks of 100 nm or less is preferable in terms of ensuring support strength.

As in a fifteenth aspect of the invention, the fine pores should have a diameter or width 1000 times or less the diameter of the catalyst ions that are loaded in order to allow loading of catalyst components. At this time, if the number of the fine pores is $1 \times 10^{11}$/L or more, an amount of catalyst components equivalent to that of the prior art can be loaded.

In a sixteenth aspect of the invention, the fine pores are in the form of defects in the base ceramic that are formed by substituting a portion of the composite elements of the cordierite with a metal element having a different valency. Since cordierite has superior thermal shock resistance, it is preferable as a catalyst body for automobile exhaust gas.

In this case, as in a seventeenth aspect of the invention, the defects are composed of at least one type of oxygen vacancies or lattice defects, and are formed by substituting a portion of the composite elements of the cordierite with a metal having a different valency. An amount of catalyst metal equal to that of the prior art can be loaded if $4 \times 10^{-6}$% or more of cordierite crystals having one or more of these defects are contained in the unit crystal lattice of the cordierite.

As in an eighteenth aspect of the invention, the form of the ceramic support may be at least one type selected from a honeycomb, pellets, powder, foam, fibers or hollow fibers, and the optimum form can be selected according to the application.

DESCRIPTION OF THE PREFERRED EMBODIMENTS

Figure 1:
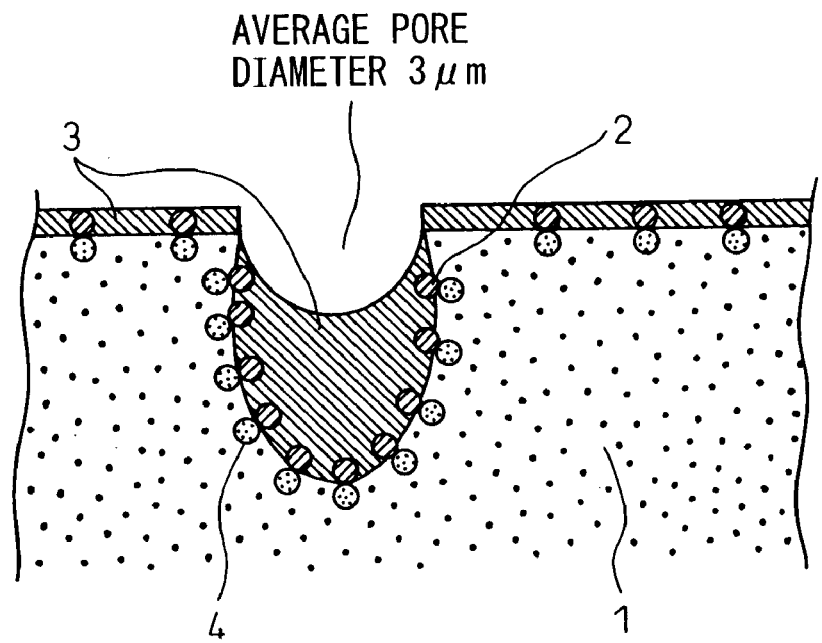
FIG. 1 is a drawing showing the surface structure of a ceramic catalyst body of a first example of the present invention, and provides a schematic representation of the primary catalyst component and co-catalyst component being loaded onto pore inner surfaces.

The following provides an explanation of the preferred embodiments of the present invention with reference to the drawings. FIG. 1 shows a schematic representation of the structure of the surface portion of the ceramic catalyst body of the present invention, and a ceramic support (1) is used for the ceramic support that enables catalyst components to be loaded directly onto the surface of a base ceramic. The ceramic catalyst body of the present invention has a primary catalyst component (2) and a co-catalyst component (3) loaded onto this ceramic support, and is preferably used, for example, as a purification catalyst for automobile exhaust gas.

A base ceramic having for its main component cordierite represented with the theoretical composition of $2MgO.2Al_2O_3.5SiO_2$ is preferably used for the base ceramic of the ceramic support (1) that enables direct loading of catalyst components (to be referred to as a direct loading ceramic support) for purification of exhaust has requiring high heat resistance. In addition, other ceramic materials may be used instead of cordierite, examples of which include alumina, spinel, mullite, aluminum titanate, zirconium phosphate, silicon carbide, zeolite, perovskite and silica alumina. Although a ceramic support formed into a honeycomb shape, for example, is preferably used for a purification catalyst of automobile exhaust gas, the form of the support is not limited to a honeycomb shape, but rather may also have other forms such as pellets, powder, foam, fibers and hollow fibers.

As shown in FIG. 1, a ceramic support having a large number of substitution elements (4) on the surface of the base ceramic is preferably used for the direct loading ceramic support (1). Catalyst components can be loaded directly without forming a coating layer of γ-alumina and so forth by chemically bonding the catalyst components to these substitution elements. Those elements that allow direct loading catalyst components are elements other than those that compose the base ceramic, are able to chemically bond with the catalyst components, and are introduced by being substituted for at least one type or more of those elements that compose the base ceramic. For example, in the case of cordierite, those elements that bond more strongly with the loaded catalyst components than the composite elements and which allow direct loading of the catalyst components by chemical bonding are used for the elements substituted for Si, Al and Mg, which are the composite elements of the base ceramic excluding oxygen. Specific examples of such elements include elements that are different from these composite elements and have a d orbital or f orbital among their electron orbitals, and elements are preferably used that either have a vacant orbital for the d orbital or f orbital, or have two or more oxidation states. Elements that have a vacant orbital for the d orbital or f orbital have an energy level close to that of the loaded catalyst components (and particularly catalyst precious metals), and since they easily accept or donate electrons, easily bond with the catalyst components. In addition, elements having two oxidation states also easily accept and donate electrons, and can be expected to demonstrate similar action.

Specific examples of elements having a vacant orbital for the d orbital or f orbital include W, Ti, V, Cr, Mn, Fe, Co, Ni, Zr, Mo, Ru, Rh, Ce, Ir and Pt, and at least one type or more of these elements can be used. Among these elements, W, Ti, V, Cr, Mn, Fe, Co, Mo, Ru, Rh, Ce, Ir and Pt have two or more oxidation states, and W and Co are used particularly preferably. Specific examples of other elements having two or more oxidation states include Cu, Ga, Ge, Se, Pd, Ag and Au.

In the case of substituting a composite element of the ceramic with these substitution elements, a method can be used in which the raw material of the substitution element is added and mixed into the ceramic raw material during preparation of the ceramic raw material. In this case, a portion of the raw materials of the substituted composite element is reduced in advance corresponding to the substituted amount. Subsequently, after molding and drying the mixed raw material mixture using ordinary methods, it is degreased and fired in air. Alternatively, a ceramic raw material, in which a portion of the raw material of the substituted composite element has been reduced in advance corresponding to the substituted amount, may be mixed, molded and dried in accordance with ordinary methods, followed by adding the substitution element by impregnating in a solution containing the substitution element. After removing the compact impregnated with the substitution element from the solution and drying, it is similarly degreased and fired in air. If a method is used in which a compact is impregnated in this manner, a large amount of the substitution element can be made to be present on the surface of the compact, thereby resulting in greater effectiveness since element substitution occurs on the surface during firing thereby facilitating the formation of a solid solution.

The amount of the substitution element is such that the total substituted amount is within the range of 0.01–50%, and preferably 5–20%, of the number of atoms of the substituted composite element. Furthermore, in the case the substitution element has a different valency than the composite element of the base ceramic, although lattice defects or oxygen vacancies simultaneously occur corresponding to the difference in valency, if a plurality of substitution elements are used, and the sum of the oxidation numbers of the substitution elements is made to be equal to the sum of the oxidation numbers of the substituted composite elements, defects do not occur. Thus, in the case of not desiring to cause the occurrence of defects and so forth, there should be no change in the overall valency in this manner.

A ceramic support having a large number of fine pores that enable catalyst components to be loaded directly onto the surface of a base ceramic can be used for the direct loading ceramic support. More specifically, fine pores enabling direct loading of catalyst components are composed of at least one type of defects in the ceramic crystal lattice (oxygen vacancies or lattice defects), microcracks in the ceramic surface and deficiencies in an element that composes the ceramic, and may also be formed by combining a plurality of types. Since the diameter of a loaded catalyst ion is normally about 0.1 nm, the fine pores formed in the surface of the cordierite allow loading of catalyst component ions provided they have a diameter or width of 0.1 nm or larger, and in order to ensure the strength of the ceramic, the diameter or width of the fine pores is no more than 1000 times (100 nm) the diameter of the catalyst component ions, and preferably as small as possible. The diameter or width of the fine pores is preferably 1–1000 times the diameter of the catalyst component ions (0.1–100 nm). In order to retain catalyst component ions, the depth of the fine pores is preferably no less than one-half their diameter (0.05 nm). In the case of fine pores of this size, in order to be able to load an amount of catalyst components equal to that of the prior art (1.5 g/L), the number of fine pores should be $1\times10^{11}$/L or more, preferably $1\times10^{16}$/L or more, and more preferably $1\times10^{17}$/L or more.

Among the fine pores formed in the ceramic surface, defects in the crystal lattice consist of oxygen vacancies and lattice defects (metal vacancies in the crystal and lattice strain). Oxygen vacancies are defects that occur due to a shortage of oxygen for composing the ceramic crystal lattice, and catalyst components can be loaded into fine pores formed by having extracted oxygen. Lattice defects are defects that occur due to the incorporation of oxygen beyond the amount required for composing the ceramic crystal lattice, and catalyst components can be loaded into fine pores formed due to strain in the crystal lattice or metal vacancies in the crystal lattice.

More specifically, if a cordierite honeycomb structure contains no less than $4\times10^{-6}$%, and preferably no less than $4\times10^{-5}$%, of cordierite crystals having one or more of at least one type of oxygen vacancy or lattice defect in the unit crystal lattice, or contains no less than $4\times10^{-8}$, and preferably no less than $4\times10^{-7}$, of at least one type of oxygen vacancy or lattice defect per unit crystal lattice of the cordierite, then the number of fine pores of the ceramic support is equal to or greater than the required number described above. These fine pores can be formed according to the method described in Japanese Patent Application No. 2000-104994.

For example, in order to form oxygen vacancies in the crystal lattice, a method can be employed wherein, after forming and degreasing a cordierite raw material containing an Si source, an Al source and an Mg source, in the firing step, (1) the firing atmosphere is either reduced in pressure or made to be a reducing atmosphere, (2) the oxygen in the firing atmosphere or in the starting materials is made to be insufficient by firing in a low oxygen concentration atmosphere using a compound that does not contain oxygen for at least a portion of the raw materials, and (3) a portion of at least one type of the composite elements of the ceramic other than oxygen is substituted with an element having a smaller valency than that element. In the case of cordierite, since the composite elements are Si(4+), Al(3+), and Mg(2+) and it has a positive charge, when these elements are substituted with an element having a smaller valency, a shortage occurs in the difference in valency with the substituted element and the positive charge corresponding to the substituted amount, and in order to maintain the electrical neutrality of the crystal lattice, O(2−) having a negative charge is released resulting in the formation of oxygen vacancies.

In addition, lattice defects can be formed by (4) substituting a portion of the ceramic composite elements other than oxygen with an element having a larger valency than that element. When at least a portion of the Si, Al and Mg composite elements of cordierite are substituted with an element having a larger valency than those elements, an excess occurs in the difference in valency with the substituted element and in the positive charge corresponding to the substituted amount, and in order to maintain the electrical neutrality of the crystal lattice, O(2−) having a negative charge is incorporated in the required amount. This incorporated oxygen becomes an obstacle that causes the cordierite crystal lattice to no longer be arranged in an orderly manner and results in the formation of lattice strain. The firing atmosphere in this case is an air atmosphere and an adequate amount of oxygen is supplied. Alternatively, a portion of the Si, Al and Mg may be released in order to maintain electrical neutrality, resulting in the formation of voids. Furthermore, since the size of these defects are considered to be on the order of several Angstroms, they cannot be measured as specific surface area using an ordinary method for measuring specific surface area in the manner of BET that uses nitrogen molecules.

The numbers of oxygen vacancies and lattice defects are correlated with the amount of oxygen contained in the cordierite, and the amount of oxygen for allowing loading of the required amount catalyst components as previously described should be less than 47% by weight (oxygen vacancies) or 48% by weight or more (lattice defects). If the amount of oxygen becomes less than 47% by weight as a result of forming oxygen vacancies, the number of oxygen atoms contained in the cordierite unit crystal lattice becomes less than 17.2, and the lattice constant of the $b_o$ axis of the crystal axes of cordierite becomes less than 16.99. In addition, if the amount of oxygen becomes greater than 48% by weight as a result of forming lattice defects, the number of oxygen atoms contained in the cordierite unit crystal lattice becomes greater than 17.6, and the lattice constant of the $b_o$ axis of the crystal axes of cordierite becomes greater than or less than 16.99.

The ceramic catalyst body of the present invention is obtained by loading the primary catalyst component (2) and the co-catalyst component (3) onto the surface of the direct loading ceramic support (1). Here, as shown in FIG. 1, the direct loading ceramic support (1) normally has a large number of pores in its base ceramic structure, and in the present invention, the primary catalyst component (2) and co-catalyst component (3) are loaded not only on the outer surface of the support (on the surfaces of the cell walls if it is a honeycomb structure), but also on the inner surfaces of these pores. In FIG. 1, the direct loading ceramic support (1) is composed by, for example, introducing substitution elements (4) in the form of W and Co into the cordierite serving as the base ceramic, the primary catalyst component in the form of catalyst precious metal chemically bonds to these substitution elements present in large numbers on the surface (cell wall surfaces and pore inner surfaces), and a co-catalyst component layer is formed so as to cover its surface.

Examples of precious metals preferably used for the catalyst precious metal serving as the primary catalyst component include Pt, Rh and Pd, and one type or more can be used as necessary. When these catalyst precious metals are chemically bonded to the base ceramic, since their bonding strength increases, heat resistance becomes higher and resistance to thermal deterioration increases, enabling the catalyst precious metal to maintain a high specific surface area. Consequently, a smaller amount of co-catalyst component is required than in the prior art, and the co-catalyst component layer on the outer surface of the support can be made to be thinner. Various components can be used for the co-catalyst component according to the objective, and in the case of an automobile three-way catalyst for example, an oxygen occluding component, capable of occluding and releasing oxygen corresponding to fluctuations in ambient oxygen concentration, is used preferably. Specific examples of oxygen occluding components having such action include ceria ($CeO_2$) and ceria/zirconia solid solution ($CeO_2/ZrO_2$). Furthermore, metal elements other than precious metals can also be used for the primary catalyst component.

The large number of pores present in the base ceramic structure are formed after burning off the binder component during firing or after the components contained in the raw material have melted, and the average pore diameter is normally about 3 μm. Thus, after having been loaded in the form of catalyst ion having a diameter of about 0.1 nm, the metallized precious metal catalyst easily enters the pores. In contrast, since the oxygen occluding component or other co-catalyst component is normally composed of an oxide having a comparatively large particle diameter, it is unable to enter the pores, and there is the risk of the distance from the precious metal catalyst inside the pores increasing. Since it is necessary that the particle diameter of catalyst components be sufficiently smaller than the pore diameter in order for them to enter the pores, the average particle diameter of the catalyst components is preferably ⅓ or less the average pore diameter, and more preferably ⅙ or less. For example, if the average pore diameter is 3 μm, then the average particle diameter of the catalyst components should be 1 μm or less, and the average particle diameter of the catalyst components should preferably be 0.5 μm or less.

Both the precious metal catalyst and co-catalyst can be loaded inside the pores by reducing the average particle diameter of the catalyst components, and particularly the co-catalyst component, in this manner. As a result, the distance between the oxygen occluding component or other co-catalyst component and the precious metal catalyst loaded on the pore inner surfaces is decreased, thereby making it possible to improve oxygen occlusion. Moreover, since a constitution can be employed in which there is little co-catalyst component on the outer surface of the support (cell wall surfaces), increases in pressure loss can be suppressed. In order to obtain this effect, 50% by weight or more, and preferably 70% by weight or more, of the co-catalyst component should be loaded on the pore inner surfaces. In addition, the thickness of the co-catalyst component layer formed on the outer surface of the support (cell wall surfaces) should be 20 μm or less, and preferably 10 μm or less, to effectively demonstrate the action of the co-catalyst component while minimizing the effects on pressure loss.

Furthermore, the above effects are obtained if the primary catalyst component and co-catalyst component are at least loaded in pores in the surface portion that opens to the outer surface of the ceramic support. Since exhaust gas has difficulty in penetrating to the inner surfaces of pores located farther inside, even if the co-catalyst component is not loaded in these pores, there is no significant decrease in purification performance, and by loading the co-catalyst component onto the surface portion which easily makes contact with exhaust gas and makes the greatest contribution to purification, exhaust gas can be purified efficiently with a smaller amount of loaded co-catalyst component. Although the loaded amount of co-catalyst component is normally within the range of 20–150 g/L and preferably within the range of 40–90 g/L, since the optimum value differs according to the type and required characteristics of the co-catalyst component, the loaded amount is not necessarily within the above ranges.

Although an oxygen occluding component such as ceria ($CeO_2$) has a valency of 4+ when the atmospheric oxygen concentration is high, if the oxygen concentration decreases, the valency becomes 3+, and since electrical neutrality is destroyed as a result of a change in valency, electrical neutrality is maintained by releasing or absorbing oxygen. Namely, the oxygen occluding component has the function of adjusting the air-fuel ratio so as to obtain the optimum catalyst performance by occluding or releasing oxygen. In a ceria/zirconia ($CeO_2/ZrO_2$) solid solution, the zirconia has the action of improving heat resistance. Thus, when desiring to increase the amount of occluded oxygen, a ceria-rich oxygen occluding component should be used (e.g., 70% by weight $CeO_2$ and 30% by weight $ZrO_2$), while when desiring to enhance heat resistance, a zirconia-rich oxygen occluding component should be used (e.g., 10% by weight $CeO_2$ and 90% by weight $ZrO_2$).

However, since the oxygen occluding component is an oxide, in comparison with the primary catalyst component in the form of a catalyst precious metal, its bonding strength with W, Co and other substitution elements introduced into the cordierite is normally weak. Therefore, it is preferable to introduce a second component in the form of a transition metal element into the oxygen occluding component. Specific examples of transition metal elements include W, Ti, V, Cr, Mn, Fe, Co, Ni, Cu, Zr, Mo, Ru, Rh, Ce, Ir, Pt, Pd, Ag and Au, and at least one type or more of these elements may be used.

Figure 2:
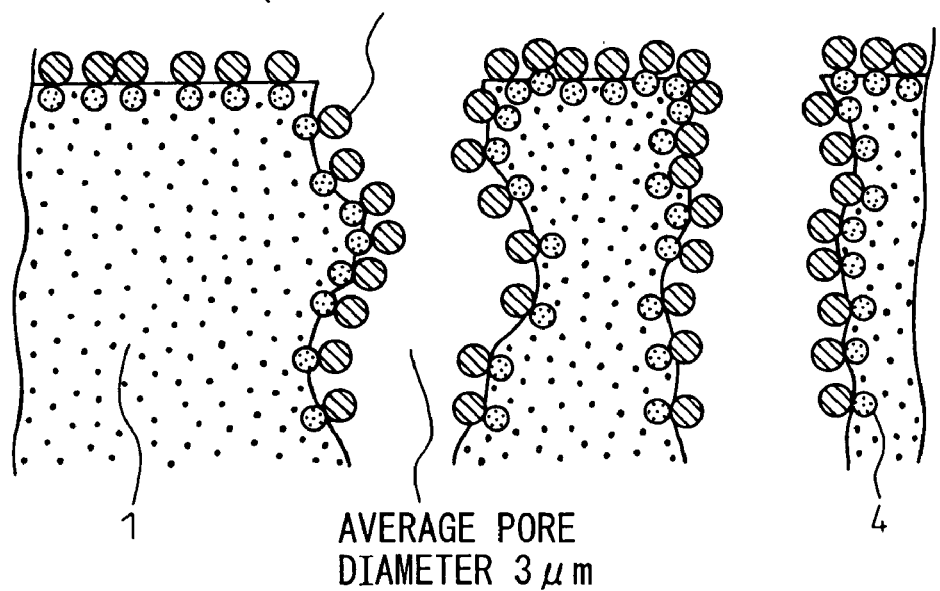
FIG. 2 shows a second example of the present invention, and is a drawing that provides a schematic representation of a co-catalyst component containing a transition metal element chemically bonded to the surface of a ceramic support.

If the bonding strength of the co-catalyst component is weak, although thermal aggregation tends to occur easily when used for long periods of time at high temperatures and there is the risk of deterioration, the introduction of a transition metal element that easily bonds with substitution elements makes it possible for the metal transition element in the co-catalyst component (W in FIG. 2) to chemically bond with substitution element (4) on the surface of the direct loading ceramic support (1) as schematically shown in FIG. 2. Accordingly, the bonding strength of the catalyst components increases, thereby making it possible to realize a catalyst body that is more resistant to deterioration. Furthermore, in the case of containing a transition metal element as a second component, the transition metal element should preferably be solid solutioned or substituted into a ceria/zirconia hot melt.

Loading of the catalyst components can be carried out using ordinary methods by preparing an aqueous or alcohol solution containing ions of the catalyst components and then impregnating into the direct loading ceramic support followed by drying and baking. Baking is carried out at a temperature equal to or above the temperature at which the solvent evaporates but lower than 1000° C., since a temperature above 1000° C. is not desirable since it results in the risk of deterioration. In the case of co-catalyst component, although a slurry can be used in which ceria, ceria/zirconia solid solution or other oxide particles have been dispersed, the particle diameter can be decreased if a solution is used that contains cerium, zirconium ions or alkoxide and so forth. As a result, a predetermined amount of catalyst components can be loaded in the absence of an α-alumina or other coating layer. The loaded amount of catalyst components can be adjusted according to the catalyst component distribution in the solution, and in the case of desiring to increase the loaded amount of catalyst components, the solution impregnation and baking steps can be repeated. Although loading of the primary catalyst component and co-catalyst component is normally carried out for each component, it can also be carried out simultaneously using a solution containing a plurality of components.

EXAMPLE 1

A ceramic body was produced according to the method described below in order to confirm the effects of the present invention. First, using talc, kaolin, alumina and aluminum hydroxide for the cordierite raw material, the raw material was formulated so as to approach the theoretical composition of cordierite by substituting 5% of the Si source with W and 5% of the Si source with Co. Binder, lubricant, moisture retention agent and water were then added in suitable amounts to this raw material followed by kneading to form a honeycomb shape having a cell wall thickness of 100 μm, cell density of 400 cpsi (number of cells per square inch) and diameter of 50 mm. The resulting honeycomb compact was fired at 1260° C. in an air atmosphere to obtain a direct loading ceramic support comprised of a cordierite honeycomb structure.

In order to load a primary catalyst component in the form of a catalyst precious metal onto the direct loading ceramic support obtained in the manner described above, the ceramic support was immersed for 5 minutes in an ethanol solution in which was dissolved 0.035 mol/L of chloroplatinic acid and 0.025 mol/L of rhodium chloride followed by removing the excess solution, drying and metallizing by baking at 600° C. in an air atmosphere. The amount of loaded catalyst was Pt/Rh=1.0/0.2 g/L. Next, the direct loading ceramic support loaded with the catalyst precious metal was immersed for 5 minutes in a slurry in which was dispersed a co-catalyst component in the form of ceria/zirconia solid solution particles having an average particle diameter of 0.1 μm. After lifting out the support and removing excess slurry, it was dried and then baked at 600° C. in an air atmosphere to coat the ceria/zirconia solid solution and obtain a ceramic catalyst body. The loaded amount of ceria/zirconia solid solution was 90 g/L.

The thickness of the co-catalyst layer composed of ceria/zirconia solid solution formed on the cell wall surfaces of this ceramic catalyst body, the amount of co-catalyst component loaded onto the pore inner surfaces, pressure loss and the purification performance on $C_3H_6$ after carrying out a heat endurance test for 5 hours at 800° C. in an air atmosphere were evaluated. The evaluation conditions were as indicated below, and the 50% purification temperature ($T_{50}$) for $C_3H_6$ at that time was measured.

Ceramic support: 35 cc (φ30×L50)
SV: 41000/hr
Gas composition: A/F=14.55

The results are shown in Table 1. In addition, pressure loss was determined by measuring the pressure difference in front of and behind the catalyst body with a pressure gauge.
Ceramic catalyst body: φ103×L135

Air flow rate: 1500 L/min

TABLE 1

| | Co-catalyst component (oxygen occluding component) | Average particle diameter (μm) | Amt. of co-catalyst loaded inside pores (wt %) | Cell wall surface thickness (μm) | Pressure Loss | T50 (° C.) |
|---|---|---|---|---|---|---|
| Ex. 1 | Ceria/ | 0.1 | 90 | 3 | 0.25 | 240 |
| Ex. 2 | zirconia | 0.5 | 75 | 10 | 0.28 | 242 |
| Ex. 3 | solid solution | 1.0 | 53 | 20 | 0.31 | 245 |
| Ex. 4 | Ceria | 0.1 | 89 | 3 | 0.25 | 245 |
| Ex. 5 | ($CeO_2$) | 0.5 | 75 | 10 | 0.28 | 248 |
| Ex. 6 | | 1.0 | 52 | 20 | 0.32 | 250 |
| Ex. 7 | Transition | 0.1 | 88 | 3 | 0.25 | 242 |
| Ex. 8 | metal solid | 0.5 | 92 | 10 | 0.28 | 245 |
| Ex. 9 | solution, ceria/zirconia solid solution | 1.0 | 55 | 20 | 0.31 | 247 |
| Ex. 10 | W solid solution, ceria/zirconia solid solution | 0.5 | 98 | 1 | 0.24 | 245 |
| Comp. Ex. | Ceria/zirconia solid solution | 2.0 | 2 | 80 | 0.50 | 270 |
| Ex. 11 | Ceria/ | — | 98 | 1 | 0.24 | 245 |
| Ex. 12 | zirconia | — | 95 | 1.5 | 0.24 | 242 |
| Ex. 13 | solid solution | — | 93 | 1.8 | 0.25 | 245 |

COMPARATIVE EXAMPLE

In addition, a ceramic catalyst body was produced in the same manner as Example 1 with the exception of using a slurry in which was dispersed ceria/zirconia solid solution particles having an average particle diameter of 2.0 μm for the sake of comparison. The thickness of the co-catalyst layer, amount of co-catalyst component loaded on the pore inner surfaces, pressure loss and purification performance were measured in the same manner, and those results are also shown in Table 1.

EXAMPLES 2–9

Ceramic catalyst bodies were produced in the same manner as Example 1 with the exception of changing the types of oxygen occluding component serving as the co-catalyst component as shown in Table 1, and using slurries in which particles of these co-catalyst components were dispersed. Thickness of the co-catalyst layer, the amount of co-catalyst component on the pore inner surfaces, pressure loss and purification performance were measured in the same manner as Example 1. Those results are also shown in Table 1.

EXAMPLE 10

A ceramic catalyst body was produced in the same manner as Example 1 with the exception of using for the co-catalyst component ceria/zirconia solid solution particles in which W was solid solutioned, a slurry in which W-containing ceria/zirconia solid solution particles having an average particle diameter of 0.5 μm were dispersed, and making the loaded amount 20 g/L. Thickness of the co-catalyst layer, the amount of co-catalyst component on the pore inner surfaces, pressure loss and purification performance were measured in the same manner as Example 1. Those results are also shown in Table 1.

EXAMPLE 11

A ceramic support was produced in the same manner as Example 1, and after loading a precious metal catalyst onto the support, the co-catalyst component was loaded using an aqueous solution containing cerium ions and zirconium ions instead of using a slurry in which ceria/zirconia solid solution particles were dispersed. After impregnating the aqueous solution of cerium ions and zirconium ions into the ceramic support, drying and firing, the ceria/zirconia solid solution on the cell wall surfaces was blown off with an air blower to obtain a ceramic catalyst body. The loaded amount of ceria/zirconia hot melt was 40 g/L. Thickness of the co-catalyst layer, the amount of co-catalyst component on the pore inner surfaces, pressure loss and purification performance were measured in the same manner as Example 1, and those results are also shown in Table 1.

EXAMPLE 12

A ceramic support was produced in the same manner as Example 1, and after loading a precious metal catalyst onto the support, the co-catalyst component was loaded using a solution containing cerium alkoxide and zirconium alkoxide instead of using a slurry in which ceria/zirconia solid solution particles were dispersed. After impregnating the solution containing cerium alkoxide and zirconium alkoxide into the ceramic support, impregnated support was gelled by introducing steam followed by firing to obtain a ceramic catalyst body. The loaded amount of ceria/zirconia hot melt was 40 g/L. Thickness of the co-catalyst layer, the amount of co-catalyst component on the pore inner surfaces, pressure loss and purification performance were measured in the same manner as Example 1, and those results are also shown in Table 1.

EXAMPLE 13

A ceramic support was produced in the same manner as Example 1, and after loading a precious metal catalyst onto the support, the co-catalyst component was loaded using a solution containing cerium nitrate and zirconium nitrate instead of using a slurry in which ceria/zirconia solid solution particles were dispersed. After impregnating the aqueous solution of cerium nitrate and zirconium nitrate into the ceramic support, the cerium nitrate and zirconium nitrate were co-precipitated within the pores by introduction of ammonia followed by drying and firing to obtain a ceramic catalyst body. The loaded amount of ceria/zirconia hot melt was 40 g/L. Thickness of the co-catalyst layer, the amount of co-catalyst component on the pore inner surfaces, pressure loss and purification performance were measured in the same manner as Example 1, and those results are also shown in Table 1.

According to those results as shown in Table 1, in Comparative Example 1 in which large ceria/zirconia solid solution particles having an average particle diameter of 2.0 μm were used, due to the thick co-catalyst layer on the surfaces of the cell walls of 80 μm resulting in a small amount of catalyst being loaded within the pores, the pressure loss is large and the 50% purification temperature exceeds 250° C. In contrast, in Examples 1–13, since the co-catalyst layer on the surfaces of the cells walls is 20 μm or less in all cases, and an adequate amount of co-catalyst component is present within the pores, pressure loss decreases and the 50% purification temperature is 250° C. or lower. In addition, it can also be seen that the smaller the average particle diameter, the thinner the co-catalyst layer on the cell wall surfaces, and the higher the purification performance.

As has been described above, since catalyst components are directly loaded onto the surface of direct loading ceramic support with a high level of bonding strength in the present invention, it becomes possible for the catalyst components to be highly dispersed on the support surface at a small catalyst particle diameter, and since those catalyst components that no longer function as a result of entering the pores of γ-alumina as in the prior art are no longer present, catalyst performance can be effectively demonstrated with small loaded amount of catalyst. Moreover, since the primarily catalyst component and co-catalyst component are also loaded within the pores and in close proximity to each other, a higher level of purification performance is obtained. Moreover, since a structure is employed in which there is only a small amount of co-catalyst component on the surfaces of the cell walls of the support, pressure loss can be held to a low level even if the wall thickness is reduced to lower the degree of thermal expansion or a structure is employed in which the interval between cells has been shortened in order to secure strength.

What is claimed is:

1. A ceramic catalyst body comprising a loaded primary catalyst component and a co-catalyst component onto a ceramic support that enables catalyst components to be loaded directly onto the surface of a base ceramic; wherein, the base ceramic has a structure having a large number of pores, and the primary catalyst component and co-catalyst component are loaded directly onto the base ceramic surface that includes the inner surfaces of these pores, and wherein 50% by weight or more of the co-catalyst component is loaded onto the inner surfaces of the pores, the average particle diameter of the co-catalyst component is ⅓ or less than the average pore diameter of the base ceramic, and the thickness of the layer of the co-catalyst component loaded onto the outer surface of the ceramic support is 20 μm or less.

2. The ceramic catalyst body according to claim 1, wherein 70% by weight or more of the co-catalyst component is loaded onto the inner surfaces of the pores.

3. The ceramic catalyst body according to claim 1, wherein the co-catalyst component contains an oxygen occluding component, said oxygen occluding component is at least one member selected from the group consisting of ceria, ceria-zirconia solid solution and a ceria-zirconia solid solution containing a transition metal element.

4. The ceramic catalyst body according to claim 1, wherein, in the ceramic support, at least one or more elements that compose the base ceramic is substituted with an element other than a composite element, and the ceramic support enables the catalyst components to be loaded directly onto this substitution element.

5. The ceramic catalyst body according to claim 4, wherein the catalyst components are loaded onto the substitution element by chemical bonding.

6. The ceramic catalyst body according to claim 4, wherein the substitution element is at least one or more element that has a d orbital or f orbital in its electron orbitals.

7. The ceramic catalyst body according to claim 1, wherein the base ceramic contains, as its main component, a ceramic material selected from the group consisting of cordierite, alumina, spinel, mullite, aluminum titanate, zirconium phosphate, silicon carbide, zeolite, perovskite and silica-alumina.

8. The ceramic catalyst body according to claim 1, wherein the ceramic support has a large number of fine pores that allow the catalyst to be loaded directly onto the surface of the base ceramic, and enables the catalyst components to be loaded directly into the fine pores.

9. A ceramic catalyst body according to claim 8, wherein the fine pores are composed of at least one type of defects in the ceramic crystal lattice, microcracks in the ceramic surface, and deficiencies of an element that composes the ceramic.

10. The ceramic catalyst body according to claim 9, wherein the width of the microcracks is 100 nm or less.

11. The ceramic catalyst body according to claim 9, wherein the fine pores have a diameter or width 1000 times or less than the diameter of the ions of the catalyst components that are loaded, and the number of the fine pores is $1 \times 10^{11}$/L or more.

12. The ceramic catalyst body according to claim 9, wherein the base ceramic contains cordierite, as its main component, and the fine pores are composed of defects formed by substituting a portion of the composite elements of the cordierite with a metal element having a different valency.

13. The ceramic catalyst body according to claim 12, wherein the defects are composed of at least one type of oxygen vacancy and lattice defect, and $4 \times 10^{-6}$% or more of cordierite crystals having one or more of these defects are contained in the unit crystal lattice of the cordierite.

14. The ceramic catalyst body according to claim 1, wherein the ceramic support is at least one member selected from the group consisting of honeycomb, pellets, powder, foam, fibers, and hollow fibers.

* * * * *